(12) United States Patent
Hu et al.

(10) Patent No.: US 8,167,490 B2
(45) Date of Patent: May 1, 2012

(54) MULTILAYER STRETCHY DRAWSTRING

(75) Inventors: Yu Hu, Westfield, IN (US); Thomas A. White, Farmington, NY (US); David V. Dobreski, Canandaigua, NY (US)

(73) Assignee: Reynolds Consumer Products Inc., Lake Forest, IL (US)

( * ) Notice: Subject to any disclaimer, the term of this patent is extended or adjusted under 35 U.S.C. 154(b) by 420 days.

(21) Appl. No.: 12/610,003

(22) Filed: Oct. 30, 2009

(65) Prior Publication Data

US 2010/0272379 A1    Oct. 28, 2010

(51) Int. Cl.
*B65D 33/28*    (2006.01)
(52) U.S. Cl. .......................................... 383/75; 428/35.2
(58) Field of Classification Search .................. 428/35.2; 383/75
See application file for complete search history.

(56) References Cited

U.S. PATENT DOCUMENTS

| | | | |
|---|---|---|---|
| 3,265,765 A | 8/1966 | Holden et al. | |
| 3,365,315 A | 1/1968 | Beck et al. | |
| 3,479,425 A | 11/1969 | Lefevre et al. | |
| 3,557,265 A | 1/1971 | Chisholm et al. | |
| 3,562,356 A | 2/1971 | Nyberg et al. | |
| 3,700,633 A | 10/1972 | Wald et al. | |
| 4,050,462 A | 9/1977 | Woon et al. | |
| 4,064,296 A * | 12/1977 | Bornstein et al. | 428/34.9 |
| 4,116,917 A | 9/1978 | Eckert | |
| 4,156,673 A | 5/1979 | Eckert | |
| 4,209,016 A | 6/1980 | Schaar | |
| 4,326,528 A | 4/1982 | Ryan et al. | |
| 4,386,125 A | 5/1983 | Shiraki et al. | |
| 4,430,457 A * | 2/1984 | Dobreski | 523/100 |
| 4,476,180 A | 10/1984 | Wnuk | |
| 4,479,836 A | 10/1984 | Dickover et al. | |
| 4,488,927 A | 12/1984 | Hooper | |
| 4,509,570 A | 4/1985 | Eby et al. | |
| 4,515,595 A | 5/1985 | Kievit et al. | |
| 4,611,350 A | 9/1986 | Kaczerwaski | |
| 4,685,916 A | 8/1987 | Enloe | |
| 4,704,116 A | 11/1987 | Enloe | |

(Continued)

FOREIGN PATENT DOCUMENTS

AU    784036    1/2006

(Continued)

OTHER PUBLICATIONS

Hu, et al., "Buckling in Elastomer/Pastic/Elastomer 3-Layer Film", Polymmer Composites, Dec. 2004, vol. 25, No. 6, pp. 653-661.

*Primary Examiner* — N. Edwards
(74) *Attorney, Agent, or Firm* — Baker Botts LLP

(57) ABSTRACT

The disclosed subject matter relates to a multilayer stretchy drawstring and methods of making the same. The drawstring of the disclosed subject matter is a stretched multilayer coextruded or laminated film that offers good balance between easy stretching at low strain and high strain hardening at high strain. The multilayer film includes a first layer of elastomeric polymer and second and third layers of thermoplastic polymer and is stretched beyond the deformation limit of the thermoplastic polymer and allowed to recover. This novel drawstring can be incorporated into a bag to enable the bag to be securely fitted to the upper portion of a trash container while not interfering with the intrinsic strength and operation of the drawstring.

31 Claims, 10 Drawing Sheets

U.S. PATENT DOCUMENTS

| | | | |
|---|---|---|---|
| 4,731,066 A | 3/1988 | Korpman | |
| 4,747,701 A | 5/1988 | Perkins | |
| 4,747,846 A | 5/1988 | Boland et al. | |
| 4,767,726 A | 8/1988 | Marshall | |
| 4,813,947 A | 3/1989 | Korpman | |
| 4,834,741 A | 5/1989 | Sabee | |
| 4,844,248 A | 7/1989 | Forberg et al. | |
| 4,847,134 A | 7/1989 | Fahrenkrug et al. | |
| 4,861,652 A | 8/1989 | Lippert et al. | |
| 4,880,316 A | 11/1989 | Belmont et al. | |
| 4,900,384 A | 2/1990 | Sanders et al. | |
| 4,902,249 A | 2/1990 | Morishita et al. | |
| 4,923,456 A | 5/1990 | Proxmire | |
| 4,953,704 A | 9/1990 | Cortese | |
| 5,006,380 A | 4/1991 | Fraser | |
| 5,034,078 A | 7/1991 | Hodgson, Jr. et al. | |
| 5,040,902 A | 8/1991 | Eaton et al. | |
| 5,120,138 A | 6/1992 | Midgley et al. | |
| 5,133,607 A | 7/1992 | Bonke | |
| 5,190,606 A | 3/1993 | Merkatoris et al. | |
| 5,232,118 A | 8/1993 | Samuel | |
| 5,242,436 A | 9/1993 | Weil et al. | |
| 5,296,184 A | 3/1994 | Wu et al. | |
| 5,334,428 A * | 8/1994 | Dobreski et al. | 428/34.9 |
| 5,411,618 A | 5/1995 | Jocewicz, Jr. | |
| 5,472,775 A | 12/1995 | Obijeski et al. | |
| 5,554,145 A | 9/1996 | Roe et al. | |
| 5,601,544 A | 2/1997 | Glaug et al. | |
| 5,620,431 A | 4/1997 | LeMahieu et al. | |
| 5,626,711 A | 5/1997 | Herrmann | |
| 5,665,191 A | 9/1997 | Johansson et al. | |
| 5,691,034 A | 11/1997 | Krueger et al. | |
| 5,706,524 A | 1/1998 | Herrin et al. | |
| 6,139,185 A | 10/2000 | Hamilton et al. | |
| 6,164,824 A | 12/2000 | McGlew et al. | |
| 6,402,377 B1 * | 6/2002 | Vo et al. | 383/75 |
| D513,383 S | 1/2006 | Glander et al. | |
| D513,588 S | 1/2006 | Vovan | |
| D513,986 S | 1/2006 | Healy et al. | |
| 6,981,299 B2 | 1/2006 | Savicki, Sr. | |
| 6,981,601 B2 | 1/2006 | Laveault et al. | |
| 6,981,631 B2 | 1/2006 | Fogle et al. | |
| 6,981,955 B2 | 1/2006 | Schultze et al. | |
| 6,982,113 B2 | 1/2006 | Kannankeril et al. | |
| 6,983,573 B2 | 1/2006 | Buchman | |
| 6,983,575 B2 | 1/2006 | Longo | |
| 6,983,839 B2 | 1/2006 | Bertram et al. | |
| 6,983,845 B2 | 1/2006 | Shah et al. | |
| 6,984,442 B2 | 1/2006 | Brebion et al. | |
| 6,984,604 B2 | 1/2006 | Cobb et al. | |
| 6,984,708 B2 | 1/2006 | Liu et al. | |
| 6,986,436 B2 | 1/2006 | Smith | |
| 6,986,931 B2 | 1/2006 | Ackerman et al. | |
| 6,988,617 B2 | 1/2006 | Gomes et al. | |
| 6,988,654 B2 | 1/2006 | Wnek | |
| 6,989,432 B2 | 1/2006 | Pruckmayr et al. | |
| 6,991,107 B2 | 1/2006 | Harrelson | |
| 6,991,592 B2 | 1/2006 | Wold et al. | |
| 6,991,844 B2 | 1/2006 | LeBoeuf et al. | |
| RE38,993 E | 2/2006 | Reedy et al. | |
| D514,380 S | 2/2006 | Smith et al. | |
| D514,385 S | 2/2006 | Smith et al. | |
| D514,408 S | 2/2006 | Melendy et al. | |
| D514,443 S | 2/2006 | Sarnoff | |
| D514,444 S | 2/2006 | Smith et al. | |
| D514,445 S | 2/2006 | Smith et al. | |
| D514,452 S | 2/2006 | Enriquez | |
| D514,884 S | 2/2006 | Smith et al. | |
| D514,932 S | 2/2006 | Sambrailo et al. | |
| D515,438 S | 2/2006 | Baranowski et al. | |
| D515,824 S | 2/2006 | Leisch et al. | |
| D515,866 S | 2/2006 | Wiedmeyer et al. | |
| 6,993,889 B2 | 2/2006 | Ford et al. | |
| 6,994,270 B2 | 2/2006 | Wongosari et al. | |
| 6,994,331 B2 | 2/2006 | Coney | |
| 6,994,335 B2 | 2/2006 | Porchia et al. | |
| 6,994,469 B2 * | 2/2006 | Sleight et al. | 383/43 |
| 6,994,535 B2 | 2/2006 | Pawloski | |
| 6,996,335 B2 | 2/2006 | Zobele | |
| 6,996,879 B1 | 2/2006 | Savicki | |
| 6,996,948 B2 | 2/2006 | Koke et al. | |
| 6,996,955 B2 | 2/2006 | White, Jr. et al. | |
| 6,996,956 B2 | 2/2006 | Sperry et al. | |
| 6,997,316 B2 | 2/2006 | Sutherland | |
| 6,997,319 B2 | 2/2006 | Mahon et al. | |
| 6,998,016 B2 | 2/2006 | Yeh et al. | |
| 6,998,360 B1 | 2/2006 | Picard | |
| 7,000,520 B2 | 2/2006 | Nichols et al. | |
| 7,001,773 B2 | 2/2006 | Lepow et al. | |
| 7,001,875 B2 | 2/2006 | Requejo | |
| 7,004,320 B1 | 2/2006 | Schmidt et al. | |
| 7,004,621 B2 | 2/2006 | Roberts et al. | |
| 7,004,632 B2 | 2/2006 | Hamilton et al. | |
| 7,004,897 B2 | 2/2006 | Spivey, Sr. | |
| 7,005,395 B2 | 2/2006 | Zafiroglu et al. | |
| D516,378 S | 3/2006 | Smith et al. | |
| D516,859 S | 3/2006 | Zettle et al. | |
| D516,910 S | 3/2006 | Bresler | |
| D517,322 S | 3/2006 | Zettle et al. | |
| D517,371 S | 3/2006 | Bielawski | |
| D517,427 S | 3/2006 | Ramirez et al. | |
| D517,816 S | 3/2006 | Dwiggins et al. | |
| D517,880 S | 3/2006 | Melendy et al. | |
| D517,948 S | 3/2006 | Schreiter | |
| D518,161 S | 3/2006 | Davis et al. | |
| 7,007,802 B1 | 3/2006 | Moorman et al. | |
| 7,007,817 B2 | 3/2006 | Jochem | |
| 7,007,836 B2 | 3/2006 | Smalley | |
| 7,007,861 B2 | 3/2006 | Ketcha et al. | |
| 7,007,863 B2 | 3/2006 | Kotary et al. | |
| 7,008,694 B1 | 3/2006 | Frankel | |
| 7,009,290 B2 | 3/2006 | Bock et al. | |
| 7,009,519 B2 | 3/2006 | Leonard et al. | |
| 7,011,209 B2 | 3/2006 | Sutherland et al. | |
| 7,011,228 B2 | 3/2006 | Ordiway | |
| 7,011,425 B2 | 3/2006 | Delcourt | |
| 7,011,615 B2 | 3/2006 | Price et al. | |
| 7,011,728 B2 | 3/2006 | Dewig et al. | |
| 7,011,885 B2 | 3/2006 | Chang et al. | |
| 7,013,615 B2 | 3/2006 | Piucci, Jr. et al. | |
| 7,013,621 B2 | 3/2006 | Shanklin et al. | |
| 7,014,127 B2 | 3/2006 | Valpey, III et al. | |
| 7,014,909 B2 | 3/2006 | Rozynov et al. | |
| 7,017,240 B2 | 3/2006 | Savicki | |
| 7,017,772 B2 | 3/2006 | Meiland et al. | |
| 7,017,775 B2 | 3/2006 | Zettle et al. | |
| 7,017,829 B2 | 3/2006 | Martens, III et al. | |
| 7,017,856 B2 | 3/2006 | Moody et al. | |
| 7,018,099 B2 | 3/2006 | Caudle | |
| 7,018,495 B2 | 3/2006 | Kannankeril et al. | |
| 7,018,946 B2 | 3/2006 | Shoemaker | |
| 7,019,155 B2 | 3/2006 | Manzer | |
| 7,019,271 B2 | 3/2006 | Wnek et al. | |
| D518,298 S | 4/2006 | Hynnek et al. | |
| D518,408 S | 4/2006 | Harrity et al. | |
| D518,883 S | 4/2006 | Jaworski et al. | |
| D519,327 S | 4/2006 | Tucker et al. | |
| D519,368 S | 4/2006 | Turvey | |
| 7,021,494 B2 | 4/2006 | Mazooji et al. | |
| 7,021,827 B2 | 4/2006 | Compton et al. | |
| 7,022,197 B2 | 4/2006 | Sitzmann | |
| 7,022,395 B2 | 4/2006 | Ackerman et al. | |
| 7,022,794 B2 | 4/2006 | Arai et al. | |
| 7,022,959 B2 | 4/2006 | Cole et al. | |
| 7,024,898 B1 | 4/2006 | Zuber et al. | |
| 7,025,197 B2 | 4/2006 | Sutherland | |
| 7,025,198 B2 | 4/2006 | Bekele et al. | |
| 7,025,590 B2 | 4/2006 | Bussman et al. | |
| 7,026,034 B2 | 4/2006 | LeBoeuf et al. | |
| 7,026,037 B2 | 4/2006 | Du Grosriez et al. | |
| 7,028,405 B2 | 4/2006 | Paas et al. | |
| 7,028,860 B2 | 4/2006 | Behnke et al. | |
| 7,028,866 B2 | 4/2006 | Kunesh et al. | |
| 7,028,995 B2 | 4/2006 | Weiland et al. | |
| 7,029,546 B2 | 4/2006 | Basler et al. | |
| 7,032,773 B2 | 4/2006 | Dees et al. | |
| 7,032,831 B2 | 4/2006 | Duston et al. | |

| | | | | | | |
|---|---|---|---|---|---|---|
| 7,034,087 B2 | 4/2006 | Hagiopol et al. | | 2006/0027303 A1 | 2/2006 | Hunter |
| 7,036,097 B1 | 4/2006 | El Ghali et al. | | 2006/0027578 A1 | 2/2006 | Cadiente et al. |
| D519,739 S | 5/2006 | Schuh et al. | | 2006/0070349 A1 | 4/2006 | Ford et al. |
| D520,872 S | 5/2006 | Paas et al. | | 2006/0096978 A1 | 5/2006 | Lafferty et al. |
| D520,882 S | 5/2006 | Vovan | | 2006/0096983 A1 | 5/2006 | Patterson |
| 7,036,197 B2 | 5/2006 | Zafiroglu | | 2006/0112998 A1 | 6/2006 | Smith |
| 7,036,299 B2 | 5/2006 | Hietpas et al. | | 2006/0113300 A1 | 6/2006 | Wnek et al. |
| 7,036,714 B2 | 5/2006 | Walsh et al. | | 2006/0119013 A1 | 6/2006 | Haraguchi et al. |
| 7,037,406 B2 | 5/2006 | Kershaw et al. | | 2006/0138128 A1 | 6/2006 | Cole et al. |
| 7,040,375 B2 | 5/2006 | Plotz et al. | | 2006/0144744 A1 | 7/2006 | Rodriquez et al. |
| 7,040,489 B2 | 5/2006 | Zemlin et al. | | 2006/0163252 A1 | 7/2006 | Zalewski |
| 7,040,569 B2 | 5/2006 | Schafer et al. | | 2006/0169755 A1 | 8/2006 | Spivey, Sr. |
| 7,041,197 B2 | 5/2006 | Kokko et al. | | 2006/0175334 A1 | 8/2006 | Schwarz |
| 7,043,873 B2 | 5/2006 | Westphal et al. | | 2006/0196923 A1 | 9/2006 | Tedford, Jr. |
| 7,043,888 B2 | 5/2006 | Gerulski et al. | | 2006/0198561 A1 | 9/2006 | Cornelisse |
| 7,046,920 B2 | 5/2006 | Flashinski | | 2006/0198714 A1 | 9/2006 | Lesecq |
| 7,048,025 B2 | 5/2006 | Sperry et al. | | 2006/0198960 A1 | 9/2006 | Calvert et al. |
| 7,048,113 B2 | 5/2006 | Gomes | | 2006/0201945 A1 | 9/2006 | Tedford, Jr. |
| 7,048,125 B2 | 5/2006 | Mize et al. | | 2006/0201960 A1 | 9/2006 | Frayne |
| 7,048,176 B2 | 5/2006 | Littlejohn et al. | | 2006/0202489 A1 | 9/2006 | Collingham |
| 7,048,205 B2 | 5/2006 | MoodyCliffe et al. | | 2006/0204642 A1 | 9/2006 | Adams et al. |
| 7,048,987 B2 | 5/2006 | Price et al. | | 2006/0204716 A1 | 9/2006 | Bonke |
| 7,049,387 B2 | 5/2006 | Dupre, Jr. | | 2006/0207068 A1 | 9/2006 | Lepper |
| 7,051,493 B2 | 5/2006 | Cook et al. | | 2006/0207220 A1 | 9/2006 | Ford |
| 7,052,181 B2 | 5/2006 | Smith et al. | | 2006/0207221 A1 | 9/2006 | Ausnit |
| D522,361 S | 6/2006 | Healy et al. | | 2006/0208054 A1 | 9/2006 | Littlejohn et al. |
| D522,758 S | 6/2006 | Hoeft et al. | | 2006/0210740 A1 | 9/2006 | Bekele |
| D522,759 S | 6/2006 | Hoeft et al. | | 2006/0210741 A1 | 9/2006 | Bekele |
| D523,302 S | 6/2006 | Mandell et al. | | 2006/0210742 A1 | 9/2006 | Bekele |
| 7,055,297 B1 | 6/2006 | Evangelisti et al. | | 2006/0210743 A1 | 9/2006 | Bekele |
| 7,055,715 B2 | 6/2006 | Maravich et al. | | 2006/0210744 A1 | 9/2006 | Bekele |
| 7,055,810 B2 | 6/2006 | Gage | | 2006/0210773 A1 | 9/2006 | Kannankeril |
| 7,056,569 B2 | 6/2006 | Price et al. | | 2006/0211818 A1 | 9/2006 | Kurimura et al. |
| 7,056,593 B2 | 6/2006 | Kennedy et al. | | 2006/0211823 A1 | 9/2006 | Kurimura et al. |
| 7,059,008 B2 | 6/2006 | Morgan et al. | | 2006/0213958 A1 | 9/2006 | Valenzuela et al. |
| 7,059,202 B2 | 6/2006 | Stanos et al. | | 2006/0216471 A1 | 9/2006 | Grah et al. |
| 7,059,544 B2 | 6/2006 | Leonard et al. | | 2006/0217511 A1 | 9/2006 | Locko et al. |
| 7,060,819 B2 | 6/2006 | Allgeier et al. | | 2007/0248290 A1* | 10/2007 | Melvan et al. ............... 383/43 |
| 7,060,820 B1 | 6/2006 | Sengupta et al. | | 2009/0123728 A1* | 5/2009 | Cheung et al. ............. 428/304.4 |
| 7,060,853 B2 | 6/2006 | Housley et al. | | 2010/0272379 A1* | 10/2010 | Hu et al. ..................... 383/75 |
| 7,063,231 B2 | 6/2006 | Stanos et al. | | 2011/0052103 A1* | 3/2011 | Hall ............................. 383/75 |
| 7,063,770 B2 | 6/2006 | de Jong et al. | | 2011/0091137 A1* | 4/2011 | Kent ............................ 383/75 |
| 7,063,789 B2 | 6/2006 | Colby et al. | | 2011/0123802 A1 | 5/2011 | Chang et al. |
| 7,063,879 B2 | 6/2006 | Trent et al. | | | | |
| 7,063,880 B2 | 6/2006 | Karul | | | FOREIGN PATENT DOCUMENTS | |
| 7,063,882 B2 | 6/2006 | Mossbrook et al. | | | | |
| 7,063,885 B2 | 6/2006 | Longo et al. | | AU | 2006200565 | 3/2006 |
| 7,066,360 B2 | 6/2006 | Hearld et al. | | AU | 2006201227 | 4/2006 |
| 7,067,142 B2 | 6/2006 | Yonker | | AU | 2006201324 | 4/2006 |
| 7,070,045 B2 | 7/2006 | Theelen et al. | | CA | 2 434 901 | 7/2002 |
| 7,073,308 B2 | 7/2006 | Dyke et al. | | CA | 2 539 321 | 9/2006 |
| 7,073,680 B2 | 7/2006 | Boback et al. | | DK | 1301414 T3 | 8/2006 |
| D525,866 S | 8/2006 | Oliviera | | ES | 2 246 507 T3 | 2/2006 |
| 7,089,871 B2 | 8/2006 | Smith, Jr. | | ES | 2 253 759 T3 | 6/2006 |
| 7,093,713 B2 | 8/2006 | Sutherland | | ES | 2 257 453 T3 | 6/2006 |
| 7,097,900 B2 | 8/2006 | Oda et al. | | ES | 2 257 749 T3 | 6/2006 |
| D527,628 S | 9/2006 | Patel | | FR | 1.367.590 | 7/1964 |
| D527,956 S | 9/2006 | Doliwa | | FR | 1.419.805 | 12/1965 |
| 7,100,788 B2 | 9/2006 | Cadiente et al. | | JP | 2006-75617 | 3/2006 |
| 7,100,798 B2 | 9/2006 | Spivey | | WO | 96/26132 | 8/1996 |
| 7,104,027 B2 | 9/2006 | Ford et al. | | WO | 01/96205 | 12/2001 |
| 7,758,243 B2* | 7/2010 | Bonke ............................ 383/75 | | WO | 02/14165 | 2/2002 |
| 7,807,593 B2* | 10/2010 | Patel et al. ................... 442/398 | | WO | 2004/071886 | 2/2006 |
| 7,946,765 B2* | 5/2011 | Melvan et al. ................ 383/43 | | WO | 2004/076294 | 3/2006 |
| 2006/0005369 A1 | 1/2006 | MacKenzie et al. | | WO | 2005/042369 | 5/2006 |
| 2006/0011620 A1 | 1/2006 | Tsontzidis et al. | | | | |
| 2006/0022309 A1 | 2/2006 | Tokunaga et al. | | * cited by examiner | | |

MULTILAYER STRETCHY DRAWSTRING

BACKGROUND OF THE DISCLOSED SUBJECT MATTER

1. Field of the Disclosed Subject Matter

The disclosed subject matter relates generally to stretchy polymer drawstrings or drawtapes, processes of making the same and applications of the same. Particularly, the disclosed subject matter relates to multilayer stretchy drawstrings including at least a first layer of elastomeric polymer and second and third layers of thermoplastic polymer and processes of making the same where the drawstring is stretched beyond the deformation limit of the thermoplastic polymer layers and allowed to elastically recover.

2. Description of Related Art

In order to maintain sanitary conditions, plastic bags have been used to line waste receptacles in both institutional and commercial practice. The plastic liner bag prevents waste or other materials from contacting the receptacle, as well as providing a simple and easy way to empty the container.

Because of the large variety of container sizes, it is difficult to secure the bag to the container so that it will not slide down into the receptacle. Merely folding the top of the bag over the sides of the receptacle is not satisfactory, since the materials in the bag tend to pull the bag into the receptacle.

A variety of drawstring plastic bags have been developed and typical drawstring bags include a drawstring or drawtape in a hem at the mouth of the bag. Drawstrings in such typical drawstring bags can be manufactured to be very thin and therefore inexpensive. However, the drawstring in a typical bag is not elastic and must be pulled tight in order to secure the bag to a trash container or to close the bag after use. It is preferable to have an elastic drawstring that naturally contracts to secure the bag to a trash container.

Drawstring bags with elastic mouth features have been developed to enable a bag to be securely fitted to the upper portion of a trash container while not interfering with the intrinsic strength and operation of the drawstring. Such elastic drawstrings have been developed as either a single layer of elastomers, a single layer of blended copolymers, or laminates of one folded plastic layer and one elastic layer. These approaches require 50% to 200% thicker drawstrings than typical non-elastic polymer drawstrings and are more expensive to produce both due to material cost as well as machining costs.

Such conventional drawstring bags generally have been considered satisfactory for their intended purpose. Recently, however, it has been found that in the monolayer elastomeric drawstring approach, drawstrings either exhibit too high an elasticity without real strain hardening or are too stiff to be stretched at low strain to fit around a trash container. A better balance of mechanical properties has been achieved with laminates of one folded plastic layer and one elastic layer. However, the manufacturing process for such laminates is complex and it can be difficult to get satisfactory seal strength between the elastomeric layer and the folded plastic layer.

U.S. Pat. No. 4,509,570 describes a plastic bag which has an elastic loop positioned in the hem at the top of the bag. The elastic loop provides a means to hold the bag at the top of the receptacle as well as to close the bag when it is removed from the receptacle. The elastic loop is in a highly stretched state when the bag is open and closes the top of the bag automatically when removed from the receptacle. It is difficult and expensive to manufacture a bag with the elastic band in a highly stretched state. Further, a bag having the automatic closing feature of this patent can provide a safety hazard to a child who may inadvertently obtain one of the bags and place the bag over his head. A bag having a similar elastic top is found in French Patent No. 1,419,805.

In U.S. Pat. No. 4,747,701 a plastic liner bag is described which has an elastic band partially secured to the open top of the plastic bag. The plastic band is used to overlap the top of a receptacle to hold the bag in place on the receptacle. This band cannot be used as a drawstring to close the top of the bag when it is filled. French Patent No. 1,367,590 also describes a bag having an elastic top which does not act as a drawstring.

U.S. Pat. No. 5,691,034 ("the '034 patent") describes non-tacky, microtextured, multilayer elastomeric laminates. The laminates include an elastomeric polymeric core layer, which provides elastomeric properties, and one or more polymeric skin layers that are capable of becoming microtextured. The '034 patent defines microtexture as the surface containing peak and valley irregularities or folds which are large enough to be perceived by the unaided human eye as causing increased opacity over the opacity of the laminate before microtexturing, and which irregularities are small enough to be perceived as smooth or soft to human skin. The desired microtexturing in the '034 patent provides lowered coefficient of friction and modulus, which results in a soft and silky feel. The microtexturing is created by stretching the laminate past the elastic limit of the skin layers. Due to the thin skin layers and the relatively thick elastomeric core layer, the skin layers buckle upon recovery to create a microtextured surface. The laminates of the '034 patent are useful in the garment area where the soft feel of the microtextured surface is desirable. The '034 patent in particular suggests use of the microtextured laminates as waistbands in diapers or as soft wipes. However, the microtextured laminates of the '034 patent are not suitable for use as drawstrings or drawtapes in a plastic bag due to the dominant elastomer content required to create the microtexturing as specified. The elastomer content of the '034 patent results in laminates that are overly elastic for use in drawstring plastic bags, as one cannot pick up a bag using a drawstring that is too elastic. Additionally, the microtextured skin of the '034 patent laminates is not desirable for sealing such a laminate to a plastic bag.

As evident from the related art, conventional elastic drawstring bags often require 50% to 200% thicker drawstrings than typical non-elastic polymer drawstrings and are more expensive to produce both due to material cost as well as machining costs. Certain conventional elastic laminates have desirably thin profiles, but are too stretchy or have textured surfaces that are not suitable for use in a drawstring bag.

Therefore, a need exists for a stretchy polymer drawstring that has elastic properties and matches the performance of prior polymer laminate drawstrings of one folded plastic layer and one elastic layer, while enjoying more efficient and economical manufacturing capability and having comparable gauge to traditional non-elastic monolayer drawstrings.

SUMMARY OF THE SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a drawstring bag including first and second thermoplastic body panels joined along a pair of opposing sides and a bottom bridging the opposing sides, the joined first and second body panels defining a mouth disposed opposite the bottom. A drawstring is comprised of a first layer of elastomeric polymer, a second layer of thermoplastic polymer, and a third layer of thermoplastic polymer, the thermoplastic polymer of the second layer and of the third layer each having a deformation limit, the second layer and the third layer being disposed on opposite sides of the first layer, and the drawstring is stretched beyond the deformation limit of the thermoplastic polymer of the second layer and the third layer respectively, and allowed to elastically recover. The drawstring is disposed proximate to the mouth of the bag. The drawstring can be affixed proximate the mouth of the bag. The drawstring can be affixed by thermal sealing. At least one of the thermoplastic body panels of the drawstring bag can include a hem extending along the mouth of the bag, and the drawstring can be disposed within the hem. The first layer of elastomeric polymer can include ethylene-octene copolymer or ethylene-propylene copolymer. The second layer of thermoplastic polymer and the third layer of thermoplastic polymer each can include linear low density polyethylene or high density polyethylene. Following elastic recovery, the drawstring surface is substantially smooth. The drawstring can be uniaxially stretched or biaxially stretched. The drawstring can be between about 30 and 70 percent by volume of the first layer of elastomeric polymer. Alternatively, the drawstring can be between about 40 and 70 percent by volume of the first layer or between about 45 and 65 percent by volume of the first layer of elastomeric polymer. The drawstring can be a laminate of the first, second, and third layers or can be formed by coextruding the first, second, and third layers. In a preferred embodiment, the thermoplastic polymer of the second and third layers can be the same thermoplastic polymer.

The disclosed subject matter also includes a method of making a drawstring bag including providing first and second thermoplastic body panels, joining the body panels along a pair of opposing sides and a bottom bridging the opposing sides, the joined body panels forming a mouth opposite the bottom. The method includes forming a drawstring including a first layer of elastomeric polymer, a second layer of thermoplastic polymer, and a third layer of thermoplastic polymer, the thermoplastic polymer of the second layer and of the third layer each having a deformation limit, the second and third layers being disposed on opposite sides of the first layer, and the drawstring is stretched beyond the deformation limit of the thermoplastic polymer of the second layer and the third layer respectively and allowed to elastically recover. Disposing the drawstring can include affixing the drawstring proximate the mouth of the bag. The drawstring can be affixed by thermally sealing the drawstring proximate the mouth of the bag. The method can include forming a hem extending along the mouth of the bag, and disposing the drawstring within the hem. The first layer of elastomeric polymer can include ethylene-octene copolymer or ethylene-propylene copolymer. The second layer of thermoplastic polymer and the third layer of thermoplastic polymer each can include linear low density polyethylene or high density polyethylene. The first layer of elastomeric polymer is a core layer and the second and third layers of thermoplastic polymer are outer layers disposed opposite one another on the second layer. Following elastic recovery, the drawstring surface is substantially smooth. The drawstring can be uniaxially stretched or biaxially stretched. The drawstring can be between about 30 and 70 percent by volume of the first layer of elastomeric polymer. Alternatively, the drawstring can be between about 40 and 70 percent by volume of the first layer or between about 45 and 65 percent by volume of the first layer of elastomeric polymer. The drawstring can be formed by laminating the first, second, and third layers or coextruding the first, second, and third layers. The thermoplastic polymer of the second and third layers can be the same thermoplastic polymer.

The disclosed subject matter also includes a method of making a drawstring including forming a drawstring including a first layer of elastomeric polymer, a second layer of thermoplastic polymer, and a third layer of thermoplastic polymer, the thermoplastic polymer of the second layer and of the third layer each having a deformation limit, the second layer and the third layer being disposed on opposite sides of the first layer, and the drawstring is stretched beyond the deformation limit of the thermoplastic polymer of the second and third layers respectively, and allowed to elastically recover. The first layer of elastomeric polymer can include ethylene-octene copolymer or ethylene-propylene copolymer. The second layer of thermoplastic polymer and the third layer of thermoplastic polymer each can include linear low density polyethylene or high density polyethylene. The first layer of elastomeric polymer is a core layer and the second and third layers of thermoplastic polymer are outer layers disposed opposite one another on the second layer. Following elastic recovery, the drawstring surface can be substantially smooth. The drawstring can be uniaxially stretched or biaxially stretched. The drawstring can be between about 30 and 70 percent by volume of the first layer of elastomeric polymer. Alternatively, the drawstring can be between about 40 and 70 percent by volume of the first layer or between about 45 and 65 percent by volume of the first layer of elastomeric polymer. The drawstring can be formed by laminating the first, second, and third layers or coextruding the first, second, and third layers. The thermoplastic polymer of the second and third layers can be the same thermoplastic polymer.

The disclosed subject matter also includes a drawstring including a first layer of elastomeric polymer, a second layer of thermoplastic polymer, and a third layer of thermoplastic polymer, the thermoplastic polymer of the second layer and of the third layer each having a deformation limit, the second layer and the third layer being disposed on opposite sides of the first layer, and the drawstring is stretched beyond the deformation limit of the thermoplastic polymers of the second and third layers respectively and allowed to elastically recover. The first layer of elastomeric polymer can include ethylene-octene copolymer or ethylene-propylene copolymer. The second and third layers of thermoplastic polymer can include linear low density polyethylene or high density polyethylene. The first layer of elastomeric polymer is a core layer and the second and third layers of thermoplastic polymer are outer layers disposed opposite one another on the second layer. Following elastic recovery, the drawstring surface can be substantially smooth. The drawstring can be uniaxially stretched or biaxially stretched. The drawstring can be between about 30 and 70 percent by volume of the first layer of elastomeric polymer. Alternatively, the drawstring can be between about 40 and 70 percent by volume of the first layer or between about 45 and 65 percent by volume of the first layer of elastomeric polymer. The drawstring can be a laminate of the first, second, and third layers or can be formed by coextruding the first, second, and third layers. The thermoplastic polymer of the second and third layers can be the same thermoplastic polymer.

While the subject matter is capable of various modifications and alternative forms, specific embodiments thereof have been shown by way of the process diagrams and testing data shown in FIGS. 1-6, and will herein be described in detail. It should be understood, however, that it is not intended to limit the subject matter to the particular forms disclosed but, on the contrary, the intention is to cover all modifications, equivalents, and alternatives falling within the spirit and scope of the subject matter as defined by the appended claims.

DETAILED DESCRIPTION OF THE SUBJECT MATTER

Reference will now be made in detail to the various aspects of the disclosed subject matter. The method and corresponding steps of the subject matter will be described in conjunction with the detailed description of the compositions.

The disclosed subject matter provides a drawstring bag including first and second thermoplastic body panels joined along a pair of opposing sides and a bottom bridging the sides. The joined first and second body panels define a mouth disposed opposite the bottom. A multilayer drawstring in accordance with the disclosed subject matter is disposed proximate the mouth of the bag. The drawstring includes a first layer of elastomeric polymer, a second layer of thermoplastic polymer, and a third layer of thermoplastic polymer, the thermoplastic polymer of the second layer and of the third layer each having a deformation limit. The second layer and the third layer are disposed on opposite sides of the first layer, and the drawstring is stretched beyond the deformation limit of the thermoplastic polymers of the second and third layers respectively and allowed to elastically recover. The drawstring can be affixed proximate the mouth of the bag by thermal sealing or may be disposed in a hem extending along the mouth of the bag. Following recovery, the outer surface of the drawstring can be substantially smooth. The drawstring can be uniaxially or biaxially stretched and can include between about 30 to about 70 percent by volume of elastomeric polymer. A multilayer drawstring in accordance with the disclosed subject matter can be formed by laminating the layers or coextruding the layers.

The disclosed subject matter addresses the need for a stretchy polymer drawstring that exhibits good a stretch-to-strength balance of properties and is economical to manufacture. Such a drawstring can be used, for example, as a drawstring for a disposable, plastic bag. Certain key properties associated with the drawstring of the disclosed subject matter are: (1) the drawstring must have sufficient elasticity to be stretched so as to fit around a trash receptacle, and (2) the drawstring must have sufficient strength so that a full bag of trash can be lifted by the drawstring.

Figure 1:
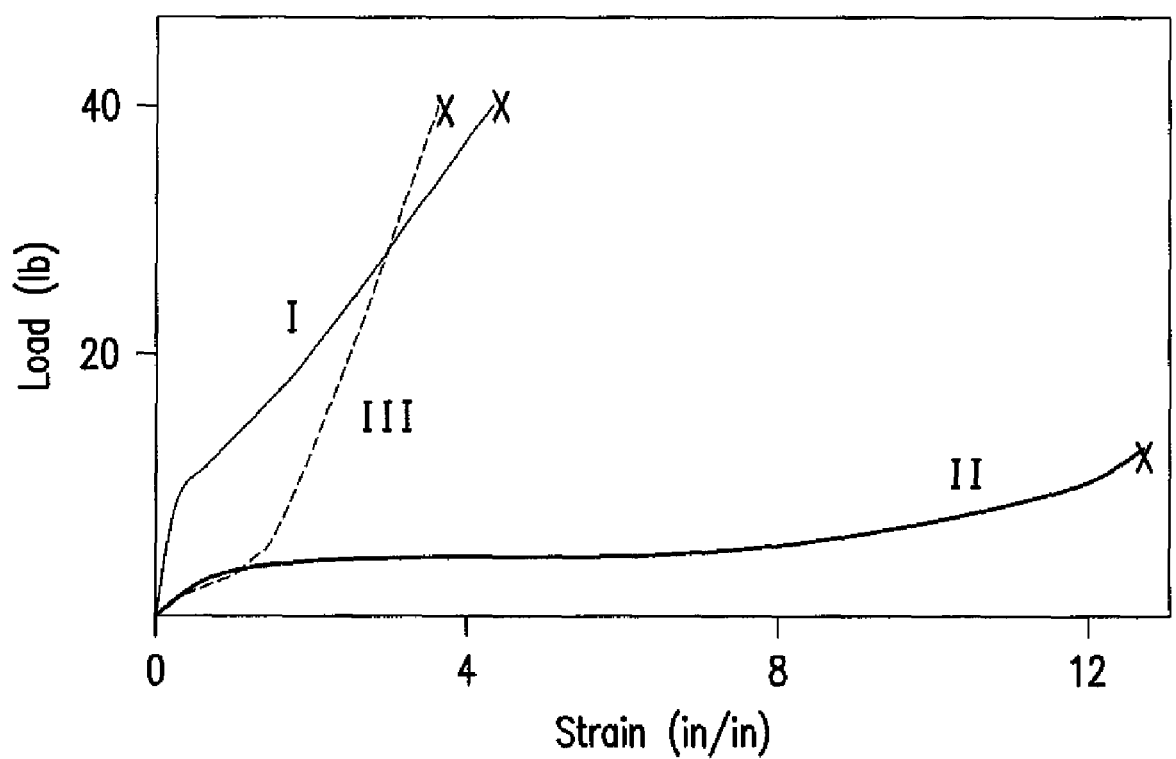
FIG. 1 is a graph depicting stress/strain curves of plastic drawstrings, elastic drawstrings, and the multilayer stretchy drawstring of the disclosed subject matter.

Strength and elasticity properties of various tapes or drawstrings are illustrated in the strain curves shown in FIG. 1. As shown in FIG. 1, a plastic tape has a strain curve similar to the curve labeled "I" which indicates a high strength but low elasticity. An elastomeric tape has a strain curve similar to the curve labeled "II" which is indicative of relatively low strength but high elasticity. A drawstring in accordance with the subject matter disclosed herein preferably has a strain curve similar to the curve labeled "III" which has relatively high strength and relatively high initial elasticity.

Sufficient elasticity for a drawstring in accordance with the disclosed subject matter requires that the drawstring should be easily stretched but still capable of recovery to grip the outside of a trash receptacle. Sufficient carry strength requires that the drawstring not be too stretchy, in which case one would have difficulty lifting a heavy bag as the drawstring stretched too far. Sufficient carry strength also requires that the drawstring does not break while being stretched in either the step of placing a drawstring bag on a trash receptacle or lifting a full trash bag by the drawstring. The target for the lower specification of drawstring tensile strength is 22 lbs and for seal strength is 16 lbs.

In order to provide a stretchy polymer drawstring having the strength and elasticity properties desired, the disclosed subject matter relates, broadly, to multi-layer elastomeric laminates comprising at least one elastomeric layer and at least two thermoplastic layers. The laminate is stretched beyond the deformation limit (elastic limit) of each of the thermoplastic layers and is allowed to recover. The stretching and recovery of the laminates in accordance with the disclosed subject matter is controlled to minimize the buckling or texturing of the surface of the laminate. Laminates stretched and recovered in a manner that creates a textured surface generally exhibit overly elastic properties for use as a polymer drawstring. By contrast, stretching and recovery of laminates in accordance with the disclosed subject matter results in a multi-layer stretchy drawstring having a substantially smooth surface.

An elastomer is a polymer with the property of elasticity. Elastomers are amorphous polymers existing above their glass transition temperature, so that considerable segmental motion is possible. Elastomers generally consist of long polymer chains that are crosslinked. The elasticity of elastomeric polymers is derived from the ability of the long chains to reconfigure themselves to distribute an applied stress. Due to the crosslinking, when an applied stress is removed, an elastomeric polymer will return to its original configuration. The elastomer can broadly include any material which is capable of being formed into a thin film layer and exhibits elastomeric properties at ambient conditions. Elastomeric means that the material will substantially resume its original shape after being stretched. Further, preferably, the elastomer will sustain only small permanent set following deformation and relaxation which set is preferably less than 20 percent and more preferably less than 10 percent of the original length at moderate elongation, e.g., about 400-500%. Generally any elastomer is acceptable. Preferably, the elastomer is capable of undergoing up to 300 to 1200% elongation at room temperature, and most preferably up to 600 to 800% elongation at room temperature. The elastomer can be both pure elastomers and blends with an elastomeric phase or content that will still exhibit substantial elastomeric properties at room temperature.

The elastomeric layer can be formed from non-heat-shrinkable polymers such as block copolymers which are elastomeric, such as those known to those skilled in the art as A-B or A-B-A block copolymers. Such copolymers are described, for example, in U.S. Pat. Nos. 3,265,765; 3,562,356; 3,700,633; 4,116,917 and 4,156,673, the content of each of which is incorporated herein by reference. Styrene/isoprene, butadiene, or ethylene-butylene/styrene (SIS, SBS, or SEBS) block copolymers are particularly useful. Other useful elastomeric compositions can include elastomeric polyurethanes, ethylene copolymers such as ethylene vinyl acetates, ethylene/propylene copolymer elastomers or ethylene/propylene/diene terpolymer elastomers. Blends of these elastomers with each other or with modifying non-elastomers are also contemplated. For example, up to 50 weight percent, but preferably less than 30 weight percent, of polymers can be added as stiffening aids such as polyvinylstyrenes, polystyrenes such as poly(alpha-methyl)styrene, polyesters, epoxies, polyolefins, e.g., polyethylene or certain ethylene/vinyl acetates, preferably those of higher molecular weight, or coumarone-indene resin. The ability to use these types of elastomers and blends provides the drawstring of the subject matter with significant flexibility.

Viscosity reducing polymers and plasticizers can also be blended with the elastomers such as low molecular weight polyethylene and polypropylene polymers and copolymers, or tackifying resins such as Wingtack™, aliphatic hydrocarbon tackifiers available from Goodyear Chemical Company. Tackifiers can also be used to increase the adhesiveness of an elastomeric layer to a thermoplastic layer. Examples of tackifiers include aliphatic or aromatic liquid tackifiers, polyterpene resin tackifiers, and hydrogenated tackifying resins.

Additives such as dyes, pigments, antioxidants, antistatic agents, bonding aids, antiblocking agents, slip agents, heat stabilizers, photostabilizers, foaming agents, glass bubbles, starch and metal salts for degradability or microfibers can also be used in the elastomeric layer(s). Suitable antistatic aids include ethoxylated amines or quaternary amines such as those described, for example, in U.S. Pat. No. 4,386,125 (Shiraki), who also describes suitable antiblocking agents, slip agents and lubricants. Softening agents, tackifiers or lubricants are described, for example, in U.S. Pat. No. 4,813,947 (Korpman) and include coumarone-indene resins, terpene resins, hydrocarbon resins and the like. These agents can also function as viscosity reducing aids. Conventional heat stabilizers include organic phosphates, trihydroxy butyrophenone or zinc salts of alkyl dithiocarbonate. Suitable antioxidants include hindered phenolic compounds and amines possibly with thiodipropionic acid or aromatic phosphates or tertiary butyl cresol, see also U.S. Pat. No. 4,476,180 (Wnuk) for suitable additives and percentages. The disclosure of each of the foregoing patents is incorporated herein by reference.

Short fibers or microfibers can be used to reinforce the elastomeric layer for certain applications. These fibers are well known and include polymeric fibers, mineral wool, glass fibers, carbon fibers, silicate fibers and the like. Further, certain particles can be used, including carbon and pigments.

Glass bubbles or foaming agents are used to lower the density of the elastomeric layer and can be used to reduce cost by decreasing the elastomer content required. These agents can also be used to increase the bulk of the elastomer. Suitable glass bubbles are described in U.S. Pat. Nos. 4,767,726 and 3,365,315, which are incorporated herein by reference. Foaming agents used to generate bubbles in the elastomer include azodicarbonamides. Fillers can also be used to some extent to reduce costs. Fillers, which can also function as antiblocking agents, include titanium dioxide and calcium carbonate.

Each of the thermoplastic layers can be formed of any semi-crystalline or amorphous polymer that is less elastic than the elastomer layer(s) and will undergo deformation at the stretch percentage that the elastomeric laminate will undergo. Therefore, slightly elastic compounds, such as some olefinic elastomers, e.g. ethylene-propylene elastomers or ethylene-propylene-diene terpolymer elastomers or ethylenic copolymers, e.g., ethylene vinyl acetate, can be used as thermoplastic layers, either alone or in blends. However, each of the thermoplastic layers is generally a polyolefin such as polyethylene, polypropylene, polybutylene or a ethylenapropylene copolymer, but can also be wholly or partly polyamide such as nylon, polyester such as polyethylene terephthalate, polyvinylidene fluoride, polyacrylate such as poly(methyl methacrylate) (only in blends) and the like, and blends thereof. The material selection for the thermoplastic layers can be influenced by the type of elastomer selected. If the elastomeric layer is in direct contact with the thermoplastic layers the thermoplastic layers should have sufficient adhesion to the elastomeric layer such that it will not readily delaminate. In a preferred embodiment, the thermoplastic polymer of the second layer is the same as the thermoplastic polymer of the first layer. However, different polymers can be used if desired.

The thermoplastic layers are used in conjunction with an elastomeric layer and can be outer or skin layers on opposite sides of the elastomeric core layer. The thermoplastic layers will modify the elastic properties of the multilayer drawstring.

Additives useful in the thermoplastic layers include, but are not limited to, mineral oil extenders, antistatic agents, pigments, dyes, antiblocking agents, provided in amounts less than about 15%, starch and metal salts for degradability and stabilizers such as those described for the elastomeric layer.

Other layers may be added between the elastomeric layer and the thermoplastic layers, such as tie layers to improve the bonding of the layers. Tie layers can be formed of, or compounded with, typical compounds for this use including maleic anhydride modified elastomers, ethyl vinyl acetates and olefins, polyacrylic imides, butyl acrylates, peroxides such as peroxypolymers, e.g., peroxyolefins, silanes, e.g., epoxysilanes, reactive polystyrenes, chlorinated polyethylene, acrylic acid modified polyolefins and ethyl vinyl acetates with acetate and anhydride functional groups and the like, which can also be used in blends or as compatiblizers in one or more of the thermoplastic or elastomeric layers. The layers are particularly useful when the bonding force between the thermoplastic and elastomeric is low. This is often the case with polyethylene thermoplastic as its low surface tension resists adhesion.

The drawstrings of the disclosed subject matter may be formed by any convenient layer forming process such as pressing layers together, coextruding the layers or stepwise extrusion of layers, but coextrusion is the presently preferred process. Coextrusion per se is known and is described, for example, in U.S. Pat. No. 3,557,265 to Chisholm et al and U.S. Pat. No. 3,479,425 to Leferre et al. Tubular coextrusion or double bubble extrusion is also possible. The layers are typically coextruded through a specialized die and/or feedblock that will bring the diverse materials into contact while forming the laminate.

Whether the drawstring is prepared by coating, lamination, sequential extrusion, coextrusion or a combination thereof, the drawstring formed and its layers will preferably have substantially uniform thicknesses across the drawstring. Preferably the layers are coextensive across the width and length of the drawstring. Drawstrings prepared in this manner have generally uniform elastomeric properties with a minimum of edge effects such as curl, modulus change, fraying and the like.

The drawstring of the subject matter generally has an unlimited range of potential widths, the width limited solely by the fabricating machinery width limitations. This allows fabrication of drawstrings for a wide variety of potential uses.

A polymer, when stretched, exhibits an elastic strain response until stretched to the elastic or deformation limit. Prior to the deformation limit, while in the elastic strain region, if the stretching is stopped, and the polymer is allowed to recover, it will return to its original shape. Stretching beyond the deformation limit of the polymer results in permanent deformation.

After forming the drawstring it is stretched past the elastic limit (or deformation limit) of the thermoplastic layers. The drawstring then is allowed to recover. Following recovery, the drawstring has a thickness greater than its thickness at full stretch. Recovery can be performed with time or by the application of heat, as discussed above. For heat recovery the temperature of activation is determined by the materials used to form the drawstring in the first instance.

Figure 2A:
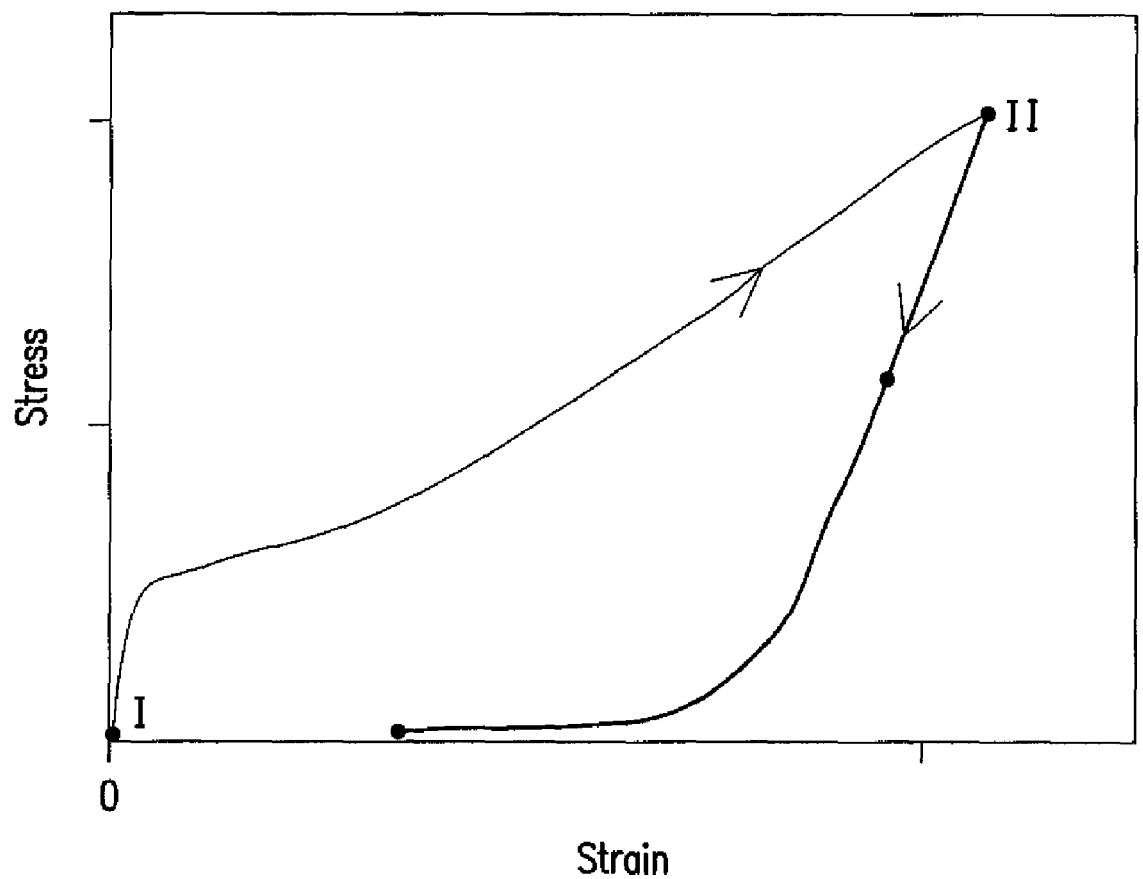
FIG. 2a is a graph depicting a stress/strain curve during the stretch and recovery process in accordance with the disclosed subject matter
Figure 2B:
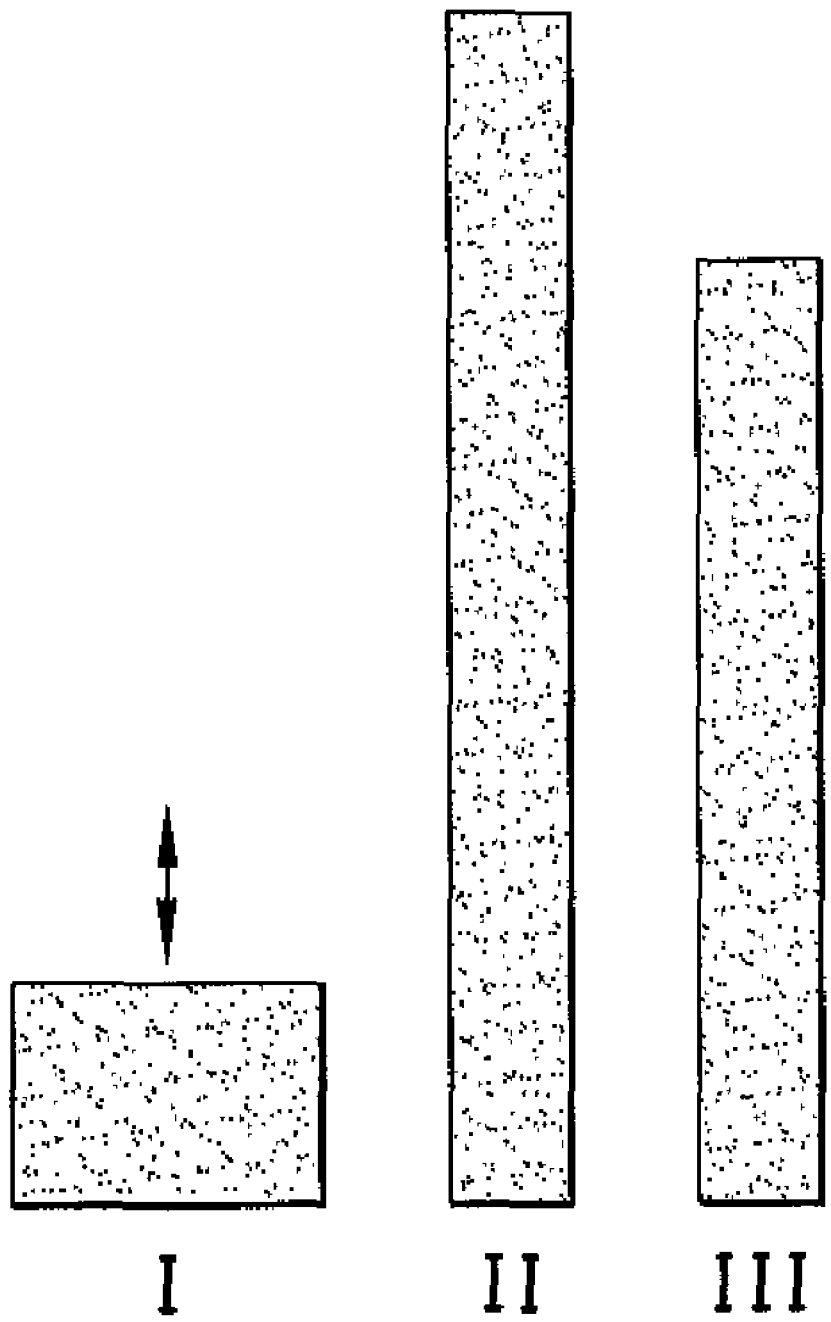
FIG. 2b is a top view of the effect of the stretch and recovery process in accordance with the disclosed subject matter.

FIG. 2a shows an exemplary stress-strain curve for a multilayer drawstring during stretch and recovery in accordance with the present subject matter. The stretch and recovery is depicted substantially in FIG. 2b. As shown, the initial drawstring (I), including a core elastomeric layer and two thermoplastic skin layers is stretched past the deformation limit of the thermoplastic layers (II), and allowed to recover (III). The recovered drawstring (III) does not exhibit surface buckling or texturing. Rather, the drawstring exhibits some compression.

The shrink recovery mechanism of laminates of the disclosed subject matter can be controlled by varying conditions of film formation, the manner of stretching the laminates, and the relative thicknesses of the elastomeric and thermoplastic layers. Additionally, the materials of the elastomeric and thermoplastic layers affect the shrink recovery of the laminate. By controlling these variables in accordance with the teaching of this subject matter, the multilayer drawstring can be designed to instantaneously recover, recover over time or recover upon heat activation. As detailed above, the stretching and recovery of laminates in accordance with the disclosed subject matter results is controlled in order to minimize the buckling or texturing of the surface of the laminate. Laminates stretched and recovered in a manner that creates a textured surface exhibit overly elastic properties for use as a polymer drawstring. Stretching and recovery of laminates in accordance with the disclosed subject matter results in a multi-layer stretchy drawstring having a substantially smooth surface, while exhibiting the desired stress-strain curve labeled "III" in FIG. 1.

Generally, where the thermoplastic layers of the multilayer drawstring are relatively thin, the multilayer drawstring will tend to contract or recover immediately. When the thermoplastic layer thickness is increased sufficiently, the multilayer drawstring can become heat shrinkable. This phenomenon can occur even when the elastomeric layer is formed from a non-heat shrinkable material. Further, by selection of the thicknesses of the elastomeric layer and the thermoplastic layers, the temperature at which the multilayer drawstring recovers by a set amount can be controlled within a set range. By altering the thickness or composition of the thermoplastic layers one can raise the activation temperature of an elastomeric core by a significant degree, generally more than at least 10° F. (5.6° C.) and preferably by 15° F. (8.3° C.) and more. Although any thermoplastic layer thickness which is effective can be employed, too thick a thermoplastic layer will cause the drawstring to remain permanently set when stretched. Generally, if thermoplastic layers are less than 30% of the drawstring such permanent set will not occur. For most heat or time shrink materials, the stretched elastomer must be cooled so that the energy released during stretching does not cause immediate heat activated recovery. Additional control over the shrink recovery mechanism to minimize microtexturing of the laminate surface can be accomplished by controlling the amount of stretch. This overall control over the shrink recovery mechanism permits adjustment of the recover mechanism of the drawstring to satisfy the requirements of a manufacturing process, rather than the need to adjust a manufacturing process to fit the shrink recovery mechanism of an elastomer.

Starting or base materials and thicknesses represent or establish the relationship between the layer ratios and stretch ratio to the shrink mechanism of the drawstring. Other variables will affect the above relationship, such as overall drawstring thickness and the presence of tie layers. However, the general relationship between the elastomer/thermoplastic ratio and the stretch ratio to the relaxation method will still be present.

Additives to the elastomer layer discussed above can significantly affect the shrink recovery mechanism. For example, stiffening aids such as polystyrene can shift an otherwise heat shrinkable laminate into a time or instant shrink laminate. By contrast, the addition of polypropylene or linear low density polyethylene (less than 15%) to a styrene/isoprene/styrene block copolymer core resulted in the opposite effect, namely transforming time or instant shrink laminates to heat shrink or no shrink laminates. However, the possibility of polyolefin use in the elastomeric layer is significant from a processing standpoint in permitting limited recycling of off batches and it can lower extruder torque.

EXAMPLES

The following examples are presented for purposes of illustration and description. These examples are representative but not dispositive and are not intended to be exhaustive or to limit the disclosed subject matter to those embodiments disclosed.

The materials used in prototype drawstrings are listed in Table 1. Two elastomers were chosen having different modulus and recovery characteristics at the same density of 0.870. Three different polyethylene polymers were tested as the plastic layer. Blue master batch was also included in certain trials for appearance.

TABLE 1

| Resin Grade | Type | Density | Melt Index |
|---|---|---|---|
| Exact 5171 | EO | 0.870 | 1.0 |
| Vistamaxx 3020 | P/E copoly | 0.870 | 2.5 |
| LL3402.48 | LLDPE | 0.942 | 2.0 |
| HD7925.30 | HDPE | 0.965 | 2.5 |

TABLE 1-continued

| Resin Grade | Type | Density | Melt Index |
| --- | --- | --- | --- |
| LD051.LT | LDPE | 0.919 | 0.25 |
| PEMB 16192 | Blue MB | 0.92 | N/A |

Figure 3A:
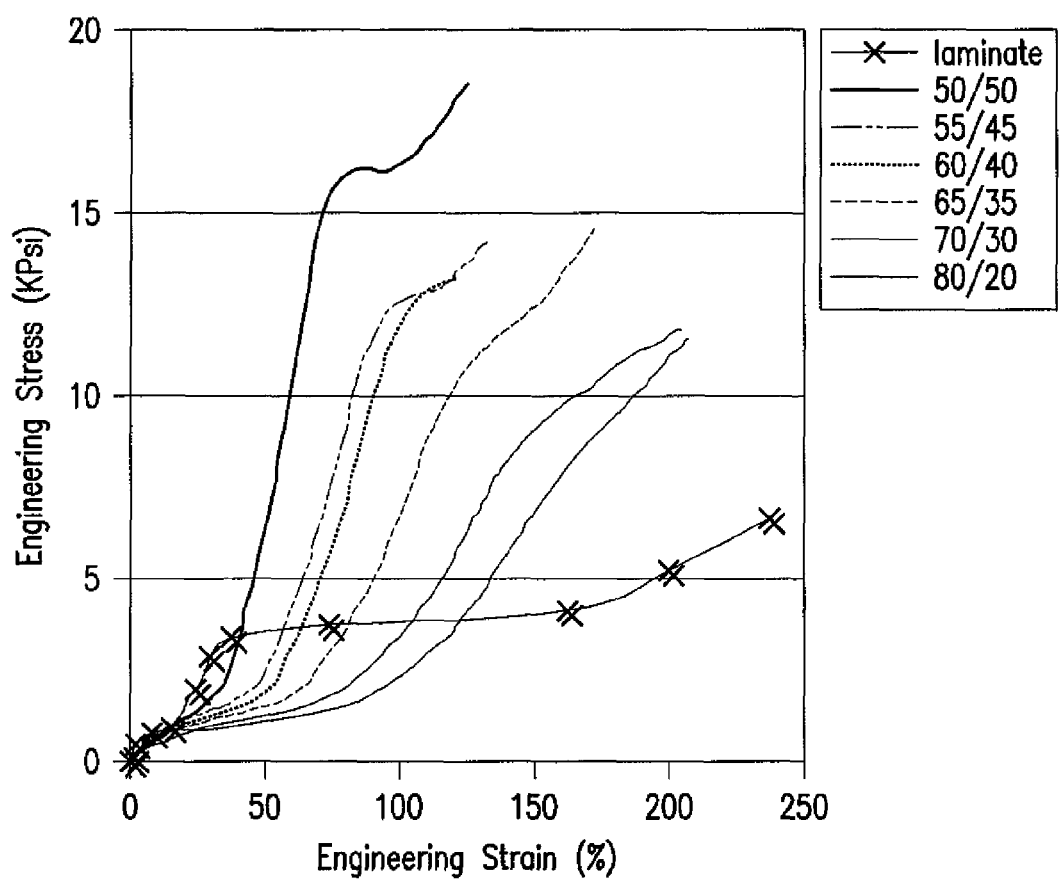
FIG. 3a is a stress/strain curve for multilayer stretchy drawstrings of sample set 1 listed in Table 2 prepared in accordance with the disclosed subject matter.
Figure 3B:
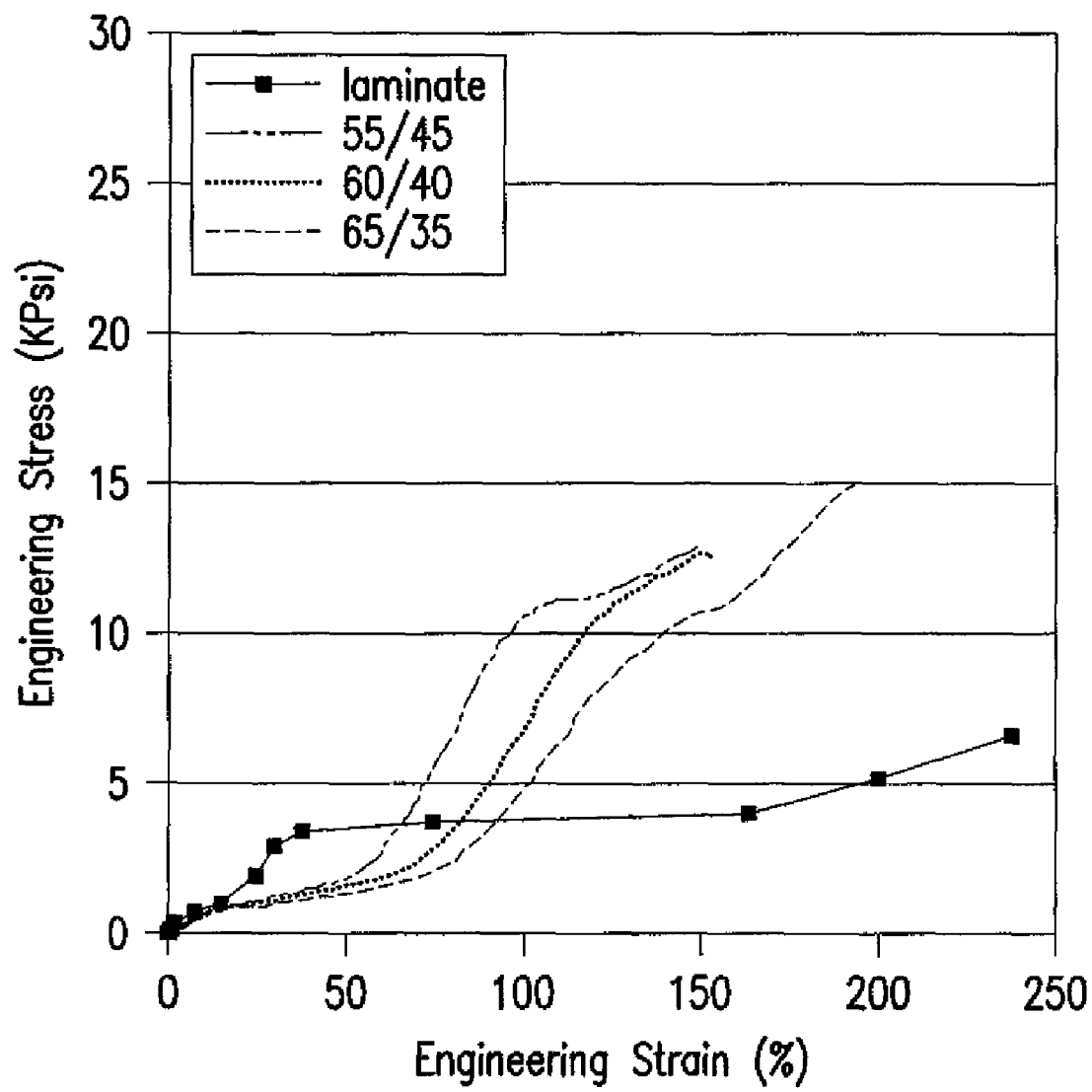
FIG. 3b is a stress/strain curve for multilayer stretchy drawstrings of sample set 2 listed in Table 2 prepared in accordance with the disclosed subject matter.
Figure 3C:
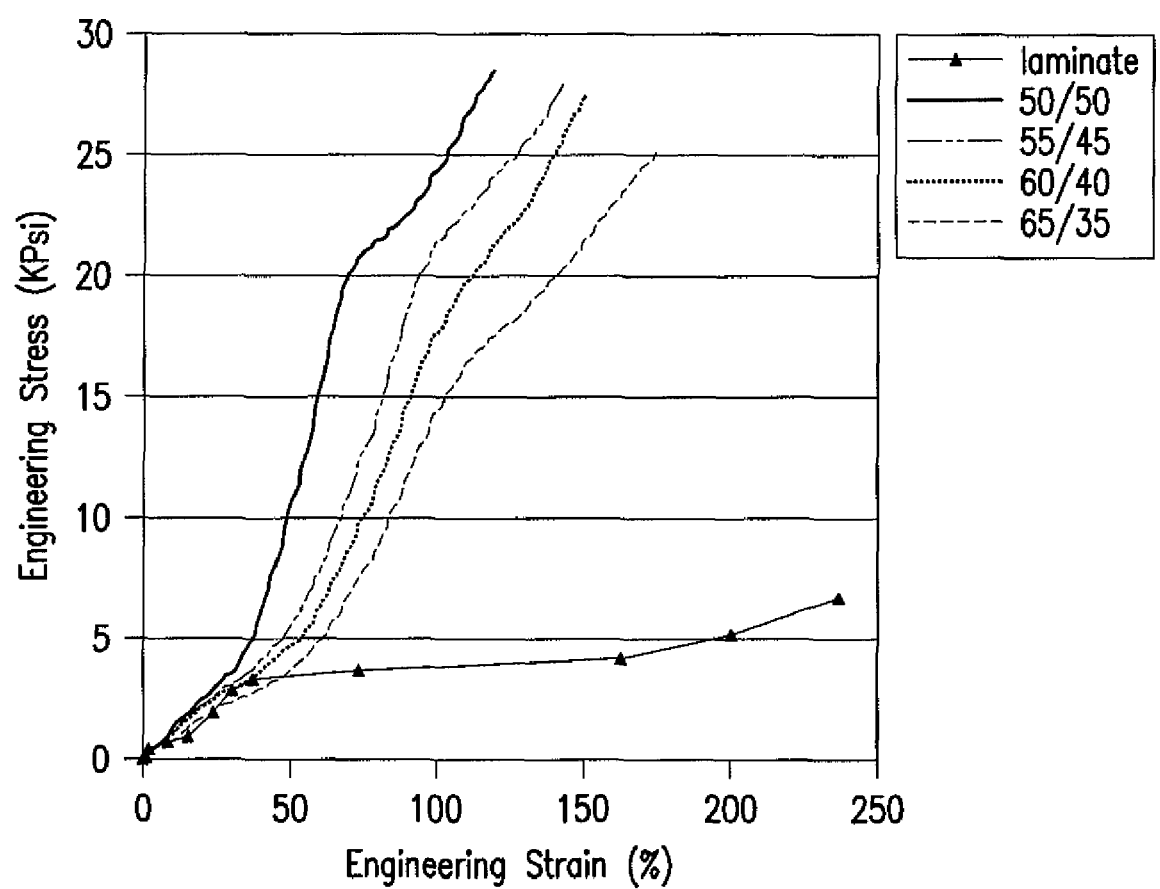
FIG. 3c is a stress/strain curve for multilayer stretchy drawstrings of sample set 3 listed in Table 3 prepared in accordance with the disclosed subject matter.

Films were coextruded into A/B/A 3-layer structure with plastic skin layers and elastomeric core layer. Different plastic and elastic materials were tested in order to determine an optimal combination and to understand the dependence of tensile properties on materials and layer ratio while keeping the gauge constant at 4.5 mils as shown in Table 2. Extrusion die and adapter temperature were maintained at 420 degrees F. for all samples. After extrusion, films were stretched past the deformation limit of the plastic skin layers. The stretching was performed at ambient conditions in an MTS tensile tester at 100% per minute to approximately seven times original length in the extrusion direction with original samples at 1 inch wide and 2 inches between grips. Tensile properties were measured at ambient conditions and 100% per minute in an MTS tensile tester. Stress-strain curves for sample sets 1-3 listed in Table 2 are shown in FIGS. 3a-3c, respectively.

TABLE 2

| Sample Sets | Plastic (A) | Elastomer (B) | T(F.) | Ratio (Plastic (A)/ Elastomer (B)) |
| --- | --- | --- | --- | --- |
| 1 | LL3402 | Exact 5171 | 430/430 | 20/80, 30/70, 35/65, 40/60, 45/55, 50/50, 60/40 |
| 2 | LL3402 | Vistamaxx | 430/400 | 35/65, 40/60, 45/55, 50/50 |
| 3 | HD7925 | Exact 5171 | 400/400 | 35/65, 40/60, 45/55, 50/50 |

In a second extrusion trial, base materials were kept constant as LL3402 and Exact 5171 with a ratio of 50/50. Different amounts of LDPE and master batch were selected, as shown in Table 3, to study the effect of composition on seal strength and appearance.

TABLE 3

| Sample # | LL3402%, Exact 5171% | PEMB % | LD 051% |
| --- | --- | --- | --- |
| 1 | 40, 40 | 6 | 14 |
| 2 | 41.5, 41.5 | 3 | 14 |
| 3 | 34.5, 34.5 | 3 | 28 |
| 4 | 43.5, 43.5 | 6 | 7 |

Figure 4:
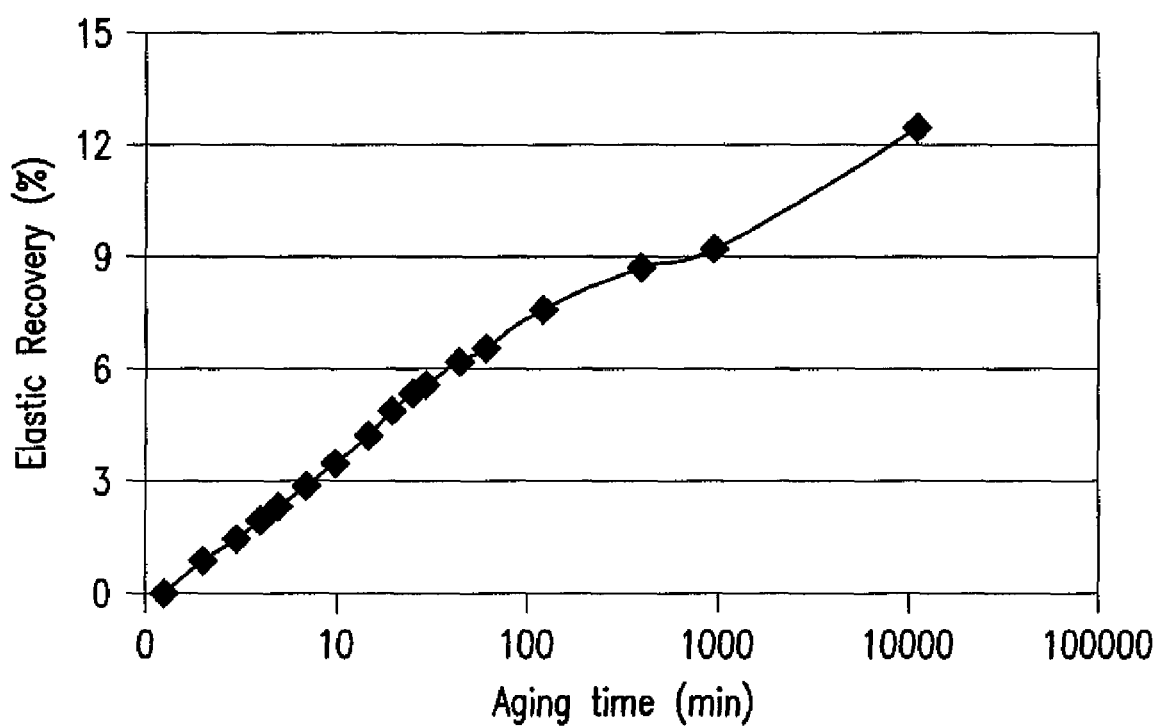
FIG. 4 is a graph depicting the effect of aging on a polymer drawstring.

In order to test seal strength, different temperatures, pressures, and dwell times were tested to optimize seal strength under zero tension. Coextruded films were stretched past the deformation limit of the plastic layers. Stretching was performed at ambient conditions by hand to six times original length. The stretched films were conditioned for two days, and each sealed to a bag at 450 degrees F., 80 psi and 600 ms dwell time with target tape length between seals at 21 inches and 22 inches. Conditioning of the films ensured controllable tape length because tape shrinkage occurred upon aging, as shown in FIG. 4. Seal strength was improved significantly with the addition of LDPE. However, there was no impact on seal strength in the compositions listed in Table 3. Good seal strength was obtained in prototype samples under zero tension where the drawstring was allowed to retract freely after the seal. Seal strength of the prototype drawstring was measured to be at 18+/−2 lbs.

Figure 5A:
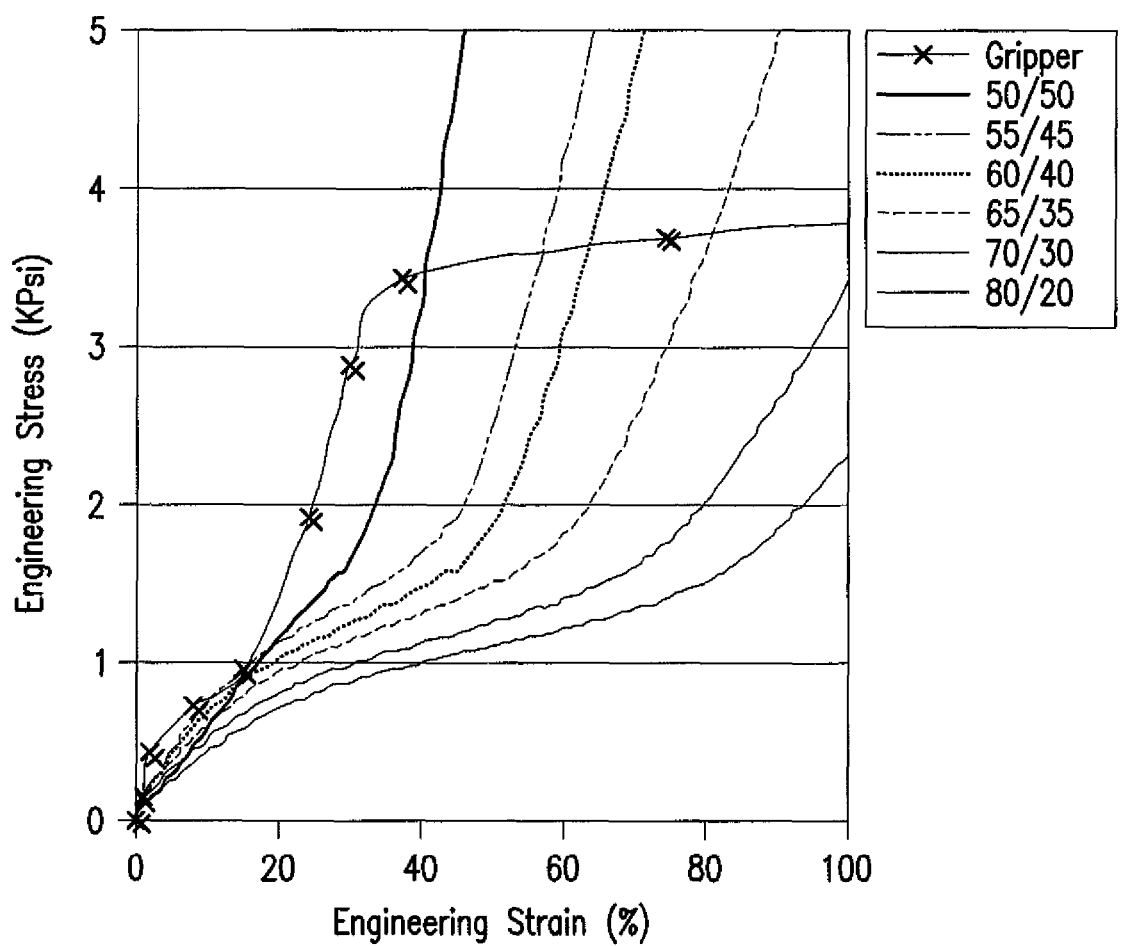
FIG. 5a is a stress/strain curve of the low strain region comparing various multilayer stretchy drawstrings of sample set 1 listed in Table 2 to a traditional prior art drawstring.
Figure 5B:
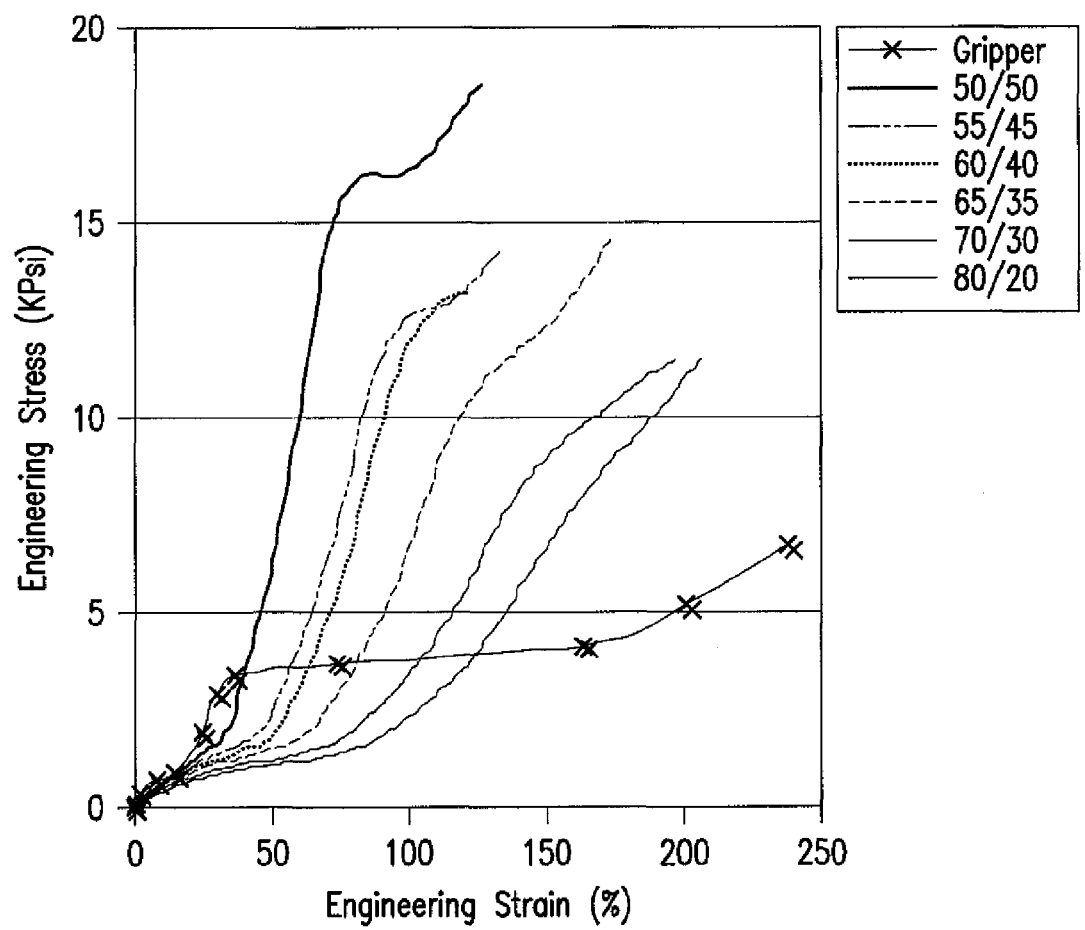
FIG. 5b is a stress/strain curve showing the entire range of the curve of FIG. 5a, comparing various multilayer stretchy drawstrings of sample set 1 listed in Table 2 to a traditional prior art drawstring.

After coextrusion, 3-layer films with various elastomer/ plastic layer ratios were stretched past the deformation limit of the plastic layers. Stretching was performed in the machine direction at a draw ratio of approximately seven times. Tensile properties of the samples were measured after 30 minutes of ambient aging. The dependence on layer ratio of the engineering stress-strain curve (with normalized force and deformation) in LL3402/Exact 5171 samples is shown in FIGS. 3a, 5a, and 5b.

Forces were normalized to the cross-sectional area because coextruded tape necked to approximately 50% after initial stretching. As the plastic layer content increased, an increase was measured in the strength of the stretched tape samples. Additionally, increased plastic layer content resulted in a lower onset point of the strain hardening (lower stretched limit). As shown in FIGS. 3a-c, 5a, and 5b, similar trends were observed in both the HDPE/Exact 5171 and LL3402/ Vistamaxx sample sets. In the low strain region prior to the occurrence of strain hardening, stress-strain behavior is mainly dependent upon the properties of the elastomer layer. Different behavior was observed between Exact samples and Vistamaxx samples due to the higher modulus and lower recover of the particular Vistamaxx grade polymer used. Using the same plastic layer content, very similar stress-strain behavior was observed in pre-stretched LD3402 and HDPE systems. However, LD3402 allowed higher plastic layer content for a more desirable balance between elasticity and strain hardening limit than the HDPE system due to the lower density and lower modulus of LD3402 compared to HDPE.

Figure 6:
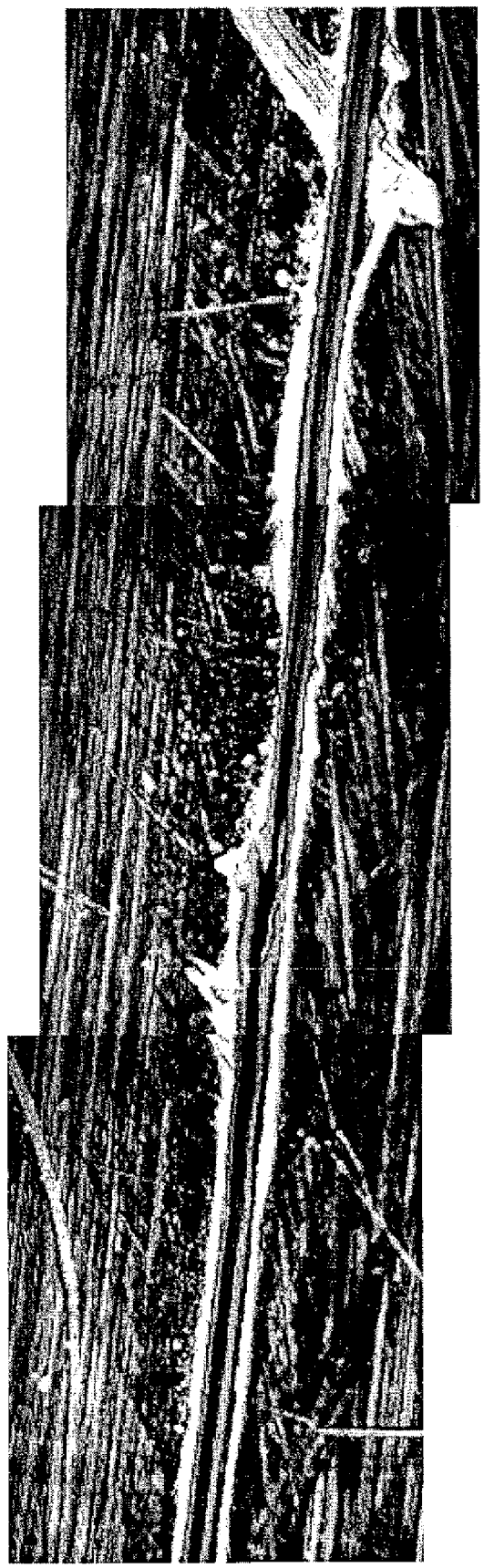
FIG. 6 is a cross sectional photograph of a three layer stretchy drawstring after stretch and recovery.

The plastic layers exhibited buckling in the LD3402 system with a high elastomer layer content. However, no sign of buckling was observed in a 40/60 or 50/50 LD3402/Exact 5171 composition where tensile properties were very comparable to those of traditional drawstring bags. An exemplary cross-section of a stretched and recovered tape of 50/50 LD3402/Exact 5171 is shown in FIG. 6. Blue master batch was added in the skin plastic layers to enhance contrast. Both skin layers appeared substantially flat and did not exhibit buckling or microtexturing. The elastomer layer as shown in FIG. 6 is under compression in the recovered film despite the lack of surface texturing or budding. Upon further stretching, when the plastic layers are no longer under compression, strain hardening begins due to direct stretching of the highly oriented plastic layer. After removal of the external force, the film recovers back to its steady state in which there is a balance between the elastomeric layer's elastic recovery and the plastic layers plastic compression. The degree of compression of the plastic layer will determine the stretching limit of the overall drawstring. It is preferred that the plastic layers exhibit compression without surface buckling or texturing.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. A drawstring bag comprising:
   first and second thermoplastic body panels joined along a pair of opposing sides and a bottom bridging the opposing sides, the joined first and second body panels defining a mouth disposed opposite the bottom;
   a drawstring comprising a first layer of elastomeric polymer, a second layer of thermoplastic polymer, and a third layer of thermoplastic polymer, the thermoplastic polymer of the second layer and of the third layer each having a deformation limit, the second layer and the third layer being disposed on opposite sides of the first layer, wherein the drawstring is stretched beyond the deformation limit of the thermoplastic polymer of the second layer and the third layer respectively and allowed to elastically recover, the drawstring has a tensile strength of at least 22 lbs;
   the drawstring being disposed proximate the mouth of the bag.

2. The drawstring bag of claim 1, wherein the drawstring is affixed proximate the mouth of the bag.

3. The drawstring bag of claim 2, wherein the drawstring is affixed by thermal sealing.

4. The drawstring bag of claim 1, comprising:
   at least one of the first and second thermoplastic body panels further defines a hem extending along the mouth of the bag; and
   the drawstring being disposed within the hem.

5. The drawstring bag of claim 1, wherein the first layer of elastomeric polymer includes ethylene-octene copolymer.

6. The drawstring bag of claim 1, wherein the first layer of elastomeric polymer includes ethylene-propylene copolymer.

7. The drawstring bag of claim 1, wherein the second layer of thermoplastic polymer includes linear low density polyethylene.

8. The drawstring bag of claim 1, wherein the second layer of thermoplastic polymer includes high density polyethylene.

9. The drawstring bag of claim 1, wherein following recovery, an outer surface of the drawstring is substantially smooth.

10. The drawstring bag of claim 1, wherein the drawstring is uniaxially stretched.

11. The drawstring bag of claim 1, wherein the drawstring is biaxially stretched.

12. The drawstring bag of claim 1, wherein the drawstring is between about 30 and 70 percent by volume of the first layer of elastomeric polymer.

13. The drawstring bag of claim 1, wherein the drawstring is between about 40 and 70 percent by volume of the first layer of elastomeric polymer.

14. The drawstring bag of claim 1, wherein the drawstring is between about 45 and 65 percent by volume of the first layer of elastomeric polymer.

15. The drawstring bag of claim 1, wherein the drawstring is a laminate of the first, second, and third layers.

16. The drawstring bag of claim 1, wherein the drawstring is formed by coextruding the first, second, and third layers.

17. The drawstring bag of claim 1, wherein the thermoplastic polymer of the second layer and the thermoplastic polymer of the third layer are the same polymer.

18. A drawstring comprising:
   a first layer of elastomeric polymer, a second layer of thermoplastic polymer, and a third layer of thermoplastic polymer, the thermoplastic polymer of the second layer and of the third layer each having a deformation limit, the second layer and the third layer being disposed on opposite sides of the first layer, wherein the drawstring is stretched beyond the deformation limit of the thermoplastic polymer of the second layer and the third layer respectively and allowed to elastically recover, the drawstring has a tensile strength of at least 22 lbs.

19. The drawstring of claim 18, wherein the first layer of elastomeric polymer includes ethylene-octene copolymer.

20. The drawstring of claim 18, wherein the first layer of elastomeric polymer includes ethylene-propylene copolymer.

21. The drawstring of claim 18, wherein the second layer of thermoplastic polymer includes linear low density polyethylene.

22. The drawstring of claim 18, wherein the second layer of thermoplastic polymer includes high density polyethylene.

23. The drawstring of claim 18, wherein following recovery, an outer surface of the drawstring is substantially smooth.

24. The drawstring of claim 18, wherein the drawstring is uniaxially stretched.

25. The drawstring of claim 18, wherein the drawstring is biaxially stretched.

26. The drawstring of claim 18, wherein the drawstring is between about 30 and 70 percent by volume of the first layer of elastomeric polymer.

27. The drawstring of claim 18, wherein the drawstring is between about 40 and 70 percent by volume of the first layer of elastomeric polymer.

28. The drawstring of claim 18, wherein the drawstring is between about 45 and 65 percent by volume of the first layer of elastomeric polymer.

29. The drawstring of claim 18, wherein the drawstring is a laminate of the first, second, and third layers.

30. The drawstring of claim 18, wherein the drawstring is formed by coextruding the first, second, and third layers.

31. The drawstring of claim 18, wherein the thermoplastic polymer of the second layer and the thermoplastic polymer of the third layer are the same polymer.

* * * * *